United States Patent
Shingai et al.

(10) Patent No.: US 6,692,152 B2
(45) Date of Patent: Feb. 17, 2004

(54) SUPPORTING STRUCTURE FOR MOTOR ROTOR

(75) Inventors: Hiroyuki Shingai, Tokyo (JP); Yasuo Shibata, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/987,406

(22) Filed: Nov. 14, 2001

(65) Prior Publication Data

US 2002/0061149 A1 May 23, 2002

(30) Foreign Application Priority Data

Nov. 17, 2000 (JP) .................................... P2000-350944

(51) Int. Cl.[7] .............................................. F16C 32/06
(52) U.S. Cl. ....................................... 384/100; 384/132
(58) Field of Search ................................ 384/100, 132; 310/90

(56) References Cited

U.S. PATENT DOCUMENTS 5,274,289 A * 12/1993 Wrobel ...................... 384/261
5,677,585 A * 10/1997 Ida et al. ...................... 310/90
6,232,690 B1 * 5/2001 Schmider ...................... 310/90
6,318,976 B1 * 11/2001 Hsieh .......................... 310/90

FOREIGN PATENT DOCUMENTS

| JP | 63-7149 | 1/1988 |
| JP | 6-185528 | 7/1994 |
| JP | 6-307395 | 11/1994 |
| JP | 7-59324 | 3/1995 |
| JP | 11-32460 | 2/1999 |

* cited by examiner

Primary Examiner—Thomas R. Hannon
(74) Attorney, Agent, or Firm—McGinn & Gibb, PLLC

(57) ABSTRACT

An annular groove portion is integrally formed for preventing splashing of the lubricating oil by extending from a mount base (10) of the motor rotor to the motor shaft (6) to the metal bearing (5) and the radial ball bearing (20), allowing a spacer member (15) making contact with an inner ring (20a) of the radial ball bearing (20) to be attached inside the annular groove portion.

20 Claims, 5 Drawing Sheets

SUPPORTING STRUCTURE FOR MOTOR ROTOR

BACKGROUND OF THE INVENTION

The present invention relates to a supporting structure for a motor rotor, and more particularly to a technique applicable to the small fan motor.

Generally, a fan motor constructed such that a motor rotor having a rotating body including blades secured to a motor shaft is supported by a bearing of a housing body having a stator is made practicable.

This fan motor has a type in which a metal bearing including an oil-impregnated sintered bearing is used and a type in which a radial ball bearing is used.

In the case of the metal bearing, as shown in an essential cross-sectional view of FIG. 5, a motor rotor in which a mount base 110 of a rotating body including the blade is fixed to a motor shaft 106 by insert molding is supported by a metal bearing 105 of a housing body 1 provided with a stator. As shown in drawing, the mount base 110 has a cone-shaped portion 110a partially formed so as to prevent splashing of the lubricating oil moving along the motor shaft 106 due to a centrifugal force developed along with the rotation, so that the lubricating oil passing from a shaft supporting portion is returned to the metal bearing again.

Also, in the case where the radial ball bearing 120 and the metal bearing 105 are provided as the bearing, a shaped portion 110a as shown is provided to give a pre-load to the inner ring of the radial ball bearing 120, as shown in an essential cross-sectional view of FIG. 6.

However, in this related machine type, the motor rotor with an exclusive shaped portion for each machine type has to be prepared, and correspondingly a specific metal mold has to be prepared, leading to a problem that the manufacturing process is complicated and the costs are increased.

SUMMARY OF THE INVENTION

Accordingly, the present invention has been achieved in the light of the above-mentioned problem, and it is an object of the invention to provide a motor rotor supporting structure in which a motor rotor with a body of rotation secured to a motor shaft is supported through a bearing of a housing body having a stator, which is applicable in both types of a oil-impregnated sintered metal bearing and a radial ball bearing, thereby preventing the manufacturing process from being complicated, and the costs from increasing.

In order to solve the aforesaid object, the invention is characterized by having the following arrangement.

(1) A motor rotor supporting structure comprising:
  a motor rotor which includes a motor shaft and a rotating member including a blade secured to the motor shaft;
  a bearing, for supporting the motor rotor, provided to a housing body including a stator; and
  an annular groove portion, for preventing splashing of lubricating oil integrally, formed with and extending from a mounting base of the motor shaft to which the motor shaft of the motor rotor is secured, wherein an inner portion of the annular groove portion is adapted to receive a spacer portion abutted to an inner ring of a radial ball bearing so that the motor rotor is applicable to both a metal bearing and a radial ball bearing.

(2) The motor rotor supporting structure according to (1), wherein the metal bearing includes an oil-impregnated sintered metal bearing.

(3) The motor rotor supporting structure according to (1), wherein the spacer is not attached to the inner portion of the annular groove portion when the metal bearing supports the motor rotor.

(4) The motor rotor supporting structure according to (1), wherein the spacer is attached to the inner portion of the annular groove portion when the radial ball bearing supports the motor rotor.

DETAILED DESCRIPTION OF PREFERRED EMBODIMENTS

Figure 1:
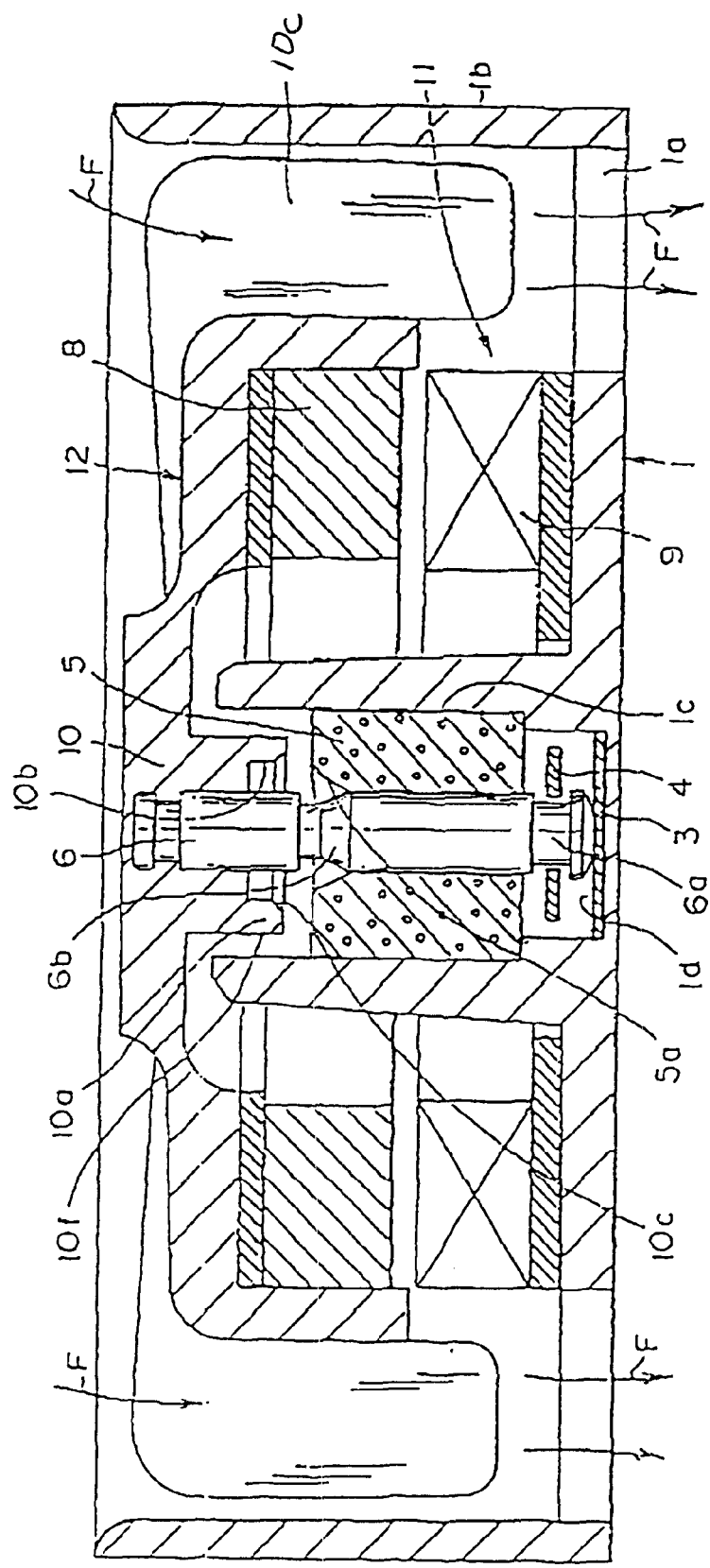
FIG. 1 is a central cross-sectional view of a brushless axial flow fan motor with a metal bearing.

A preferred embodiment of the present invention will be described below with reference to the accompanying drawings. FIG. 1 is a central cross-sectional view of a motor rotor supporting structure according to the invention, which is applied to a brushless axial flow fan motor.

In the same figure, a housing body 1 is made of a resin material such as ABS resin and polypropylene resin by injection molding. This housing body 1 is formed with a frame portion 1b continuously from a cylindrical base portion 1c through a support bar, and a plurality of openings 1a formed between the base portion 1c and the frame portion 1b, in which the air is fed in the direction of the arrow F through the plurality of openings 1a.

Also, an oil-impregnated sintered metal bearing 5 as a radial bearing for supporting the motor shaft 6 for free rotation is pressed and secured into the base portion 1c. Alternatively, after a sleeve holder made of metal, not shown, is pressed into the base portion 1c, the oil-impregnated sintered metal bearing 5 may be pressed therein. Instead of the oil-impregnated sintered metal bearing 5, a radial ball bearing as hereinafter described that is more expensive than the metal bearing 5 but has a longer continuous duration may be set within this base portion 1c, or both the metal bearing and the radial ball bearing, or two radial ball bearings may be employed to support the motor shaft 6.

On the other hand, a stator 11 formed by winding a coil 9 around a substrate is secured, by such as adhesion, to the housing body 1 around the base 1c as shown, and makes up a brushless motor that detects, by a Hall element not shown, a magnetic change of an annular permanent magnet 8 magnetized in multi-polarity fixed to the motor rotor 12, and conducts electricity to the coil 9 on the basis of the detected result, so that a rotating magnetic field is generated and the motor rotor 12 is magnetically sucked and driven to be rotated.

The motor rotor 12 is rotatably supported by the oil-impregnated sintered metal bearing 5. The motor shaft 6 manufactured from a stainless standardized bar member, for example, and the permanent magnet 8 sucked magnetically to the stator 11 are integrally formed with a plurality of blade portions 10c on an external peripheral face, an upper portion of this motor shaft 6 being insert molded into the mounting base 10, as shown.

An annular groove portion 10a for preventing the lubricating oil from splashing is integrally formed at a portion of the mounting portion to which the motor shaft 6 of the motor rotor 12 is attached toward the oil-impregnated sintered metal bearing 5. An inner peripheral face portion 10b is formed at the annular groove portion 10a and has a predetermined inner diameter capable of attaching a spacer member making contact with an inner ring of the radial ball bearing (described later) thereto. Further, a beveled portion 10c at the edge portion, and an external peripheral face portion 10f is formed at the annular groove portion 10a.

An air hole, not shown, communicating to a bottomed portion 1d is formed in a part of the base 1c holding the oil-impregnated sintered metal bearing 5 in a pressed holding state, for allowing the air expanding due to a rise in temperature within the bottomed portion 1d of the housing body 1 so that the air hole escapes through the air hole to the outside.

Before pressing securely the oil-impregnated sintered metal bearing 5 into the base 1c, a clip 4 is set within the bottomed portion 1d of the base portion 1c, and placed in a fitted state as shown in the drawing, that is, the groove portion 6a inserted into the clip 4 so as to prevent the slippage of the motor shaft 6.

A thrust washer 3 made of Nylon or Teflon and having the lubricity is disposed on the bottomed portion 1d under the clip 4 for holding the motor shaft 6 in a state for preventing slippage as mentioned above, for supporting the weight of the motor shaft 6 in a thrust direction, while the oil-impregnated sintered metal bearing exclusively supporting only the weight of the motor shaft 6 in a radial direction.

The motor shaft 6 is formed with an inclination face 6b that is opposed to an inclination face 5a formed at the edge portion of an axially supporting hole portion for the oil-impregnated sintered metal bearing 5 when inserted into the oil-impregnated sintered metal bearing 5. An oil reservoir is defined between these inclination faces.

Figure 2:
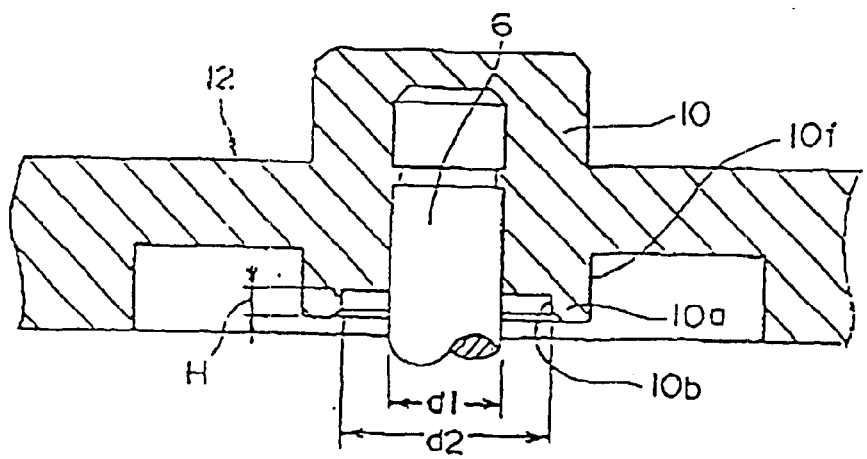
FIG. 2 is a central cross-sectional view of the axial flow fan motor in a state that a motor rotor is supported by a metal bearing.
Figure 2:
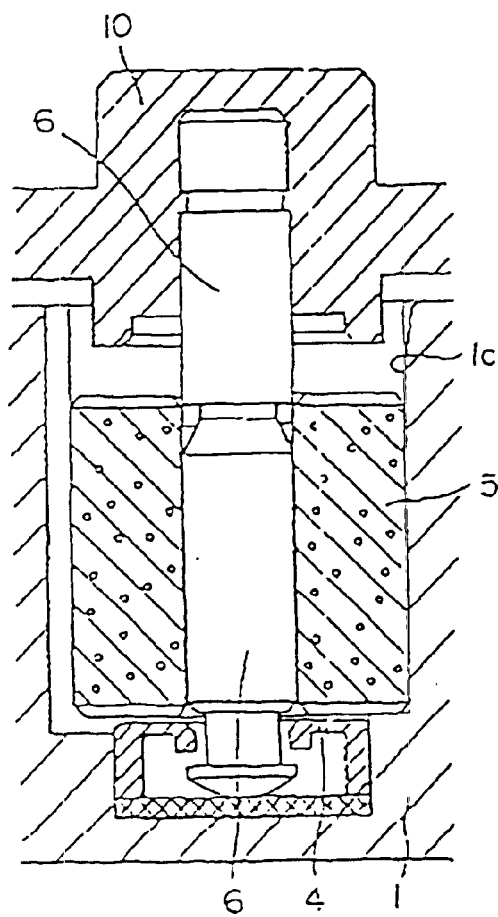
Figure 3:
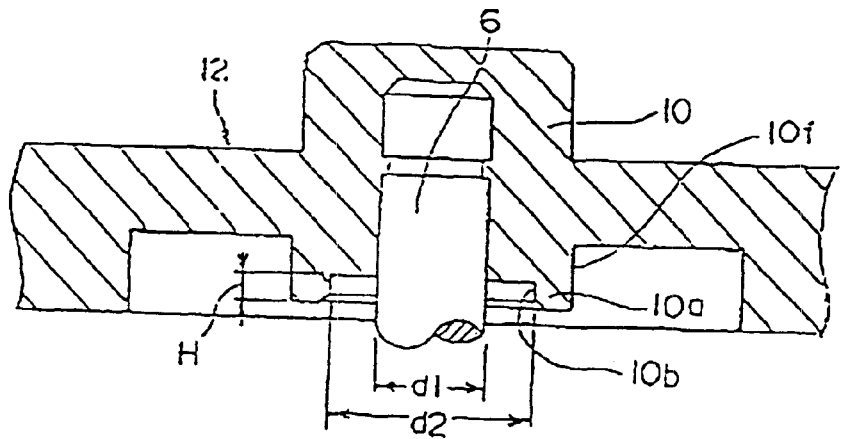
FIG. 3 is a central cross-sectional view of the axial flow fan motor in a state that a motor rotor is supported by a metal bearing and a ball bearing.
Figure 3:
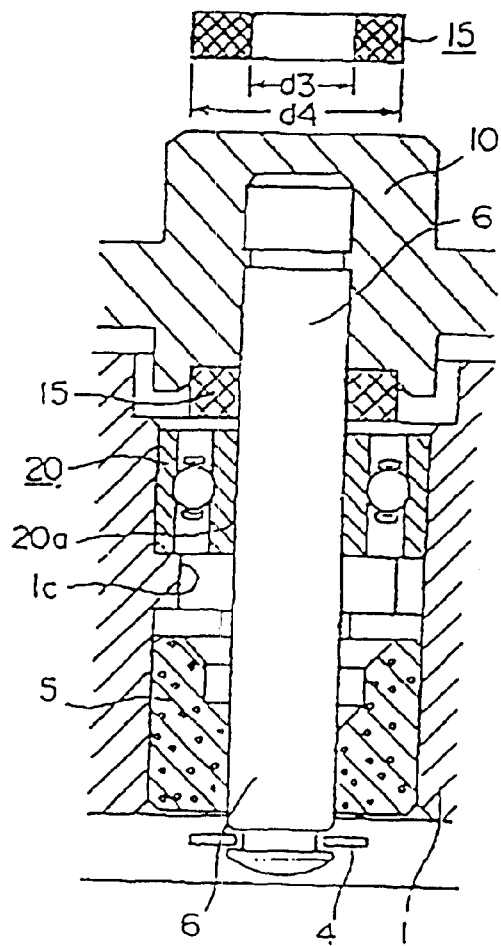

FIG. 2 and FIG. 3 are central cross-sectional views of a brushless axial flow fan motor that is also used as a process view. In the same view, the component parts already described are designated by the same or like numerals, and not described again.

An inner peripheral face portion 10b of an annular groove portion 10a has an inner diameter size d2, and is set below an outer diameter size d4 of the spacer member 15 in a process of the arrow B (FIG. 3).

The diameter d1 of the motor shaft 6 is set to be less than or equal to an inner diameter size d3 of the spacer member 15, and the spacer member 15 is set in a state contacting an inner ring 20a of the radial ball bearing 20 as indicated by hatching in the figure so as to give a pre-load to keep a predetermined bearing performance.

On the other hand, in a process of the arrow A, the motor shaft 6 is supported by the oil-impregnated sintered metal bearing 5 in the completed state (FIG. 2).

Through the above processes A and B, when the motor rotor 12 is supported by the bearing of the housing body 1 having the stator, the motor rotor 12 is applicable to both the types of the oil-impregnated sintered metal bearing 5 and the radial ball bearing 20, thereby preventing the manufacturing process from being more complicate and the costs from increasing.

Figure 4:
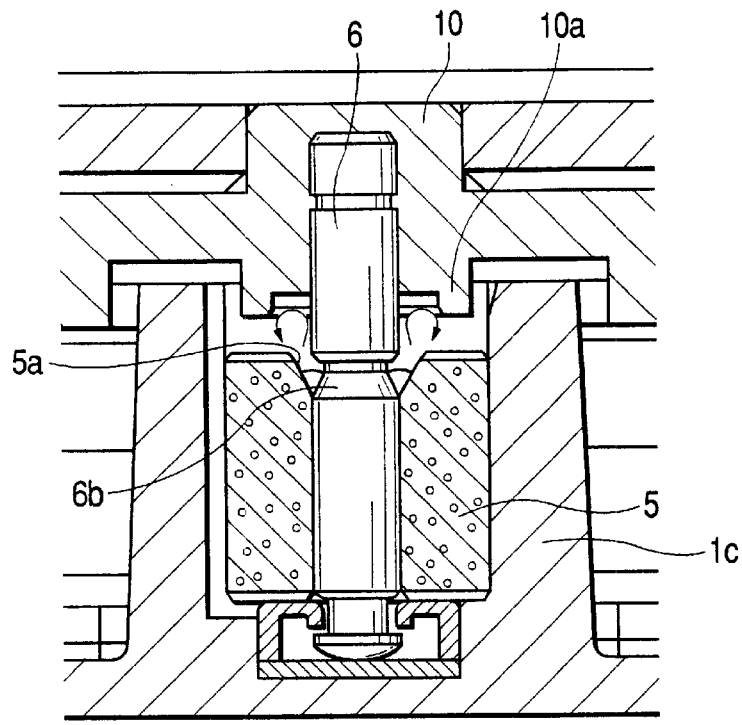
FIG. 4 is a central cross-sectional view of a motor employing an oil-impregnated sintered metal bearing.
Figure 5:
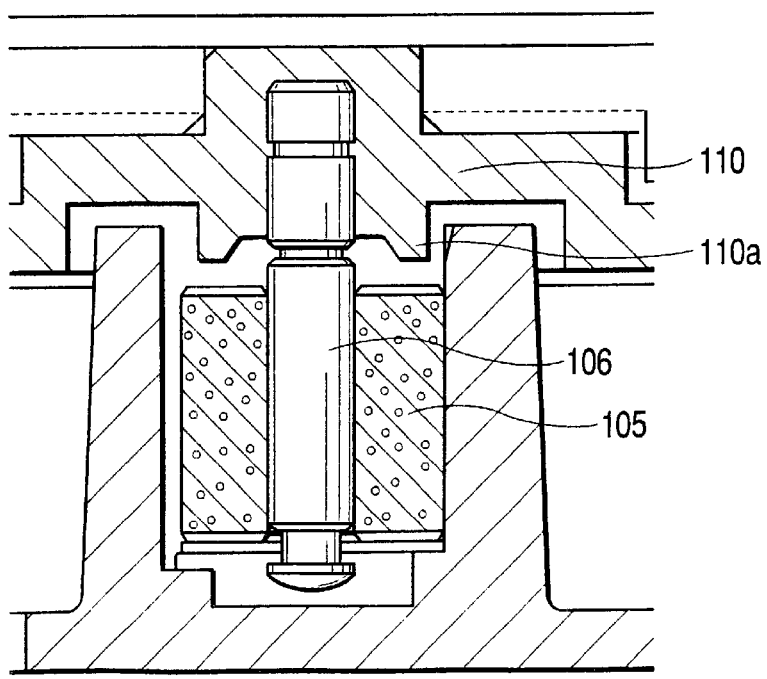
FIG. 5 is a substantial cross-sectional view of a motor in which a motor rotor is supported by a related metal bearing.
Figure 6:
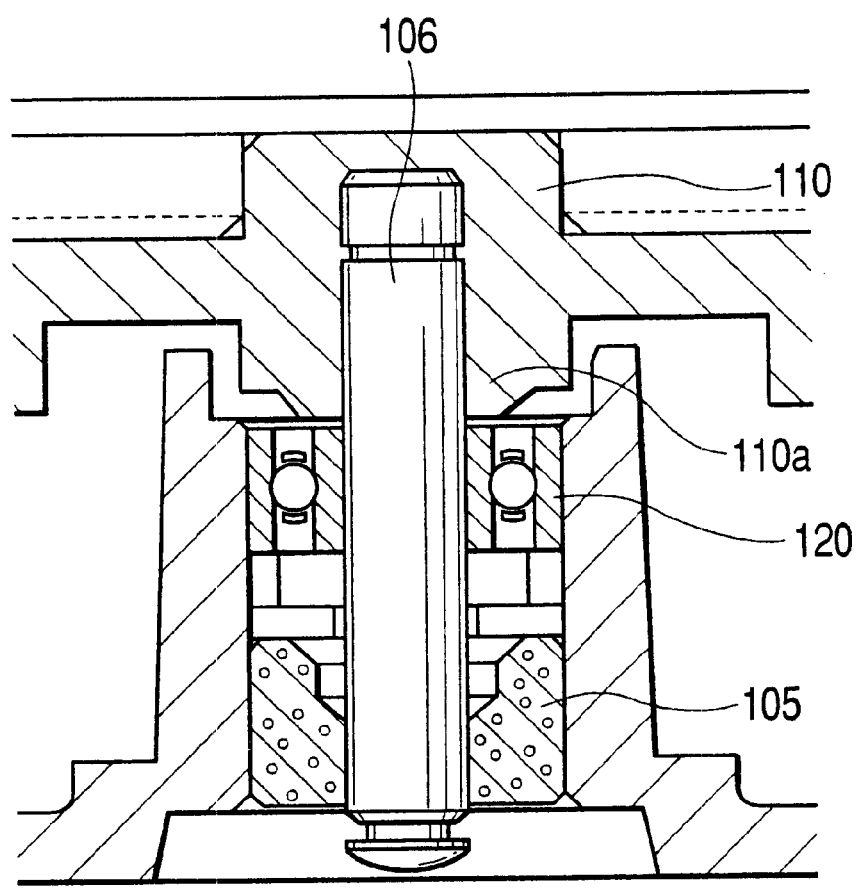
FIG. 6 is a substantial cross-sectional view of a motor in which a motor rotor is supported by a motor rotor is supported by a related metal bearing and a ball bearing.

In a cross-sectional view of the machine type using the oil-impregnated sintered metal bearing 5 of FIG. 4, a lubricating oil passing from the oil reservoir along the motor shaft 6 is transformed in direction at the inner peripheral face portion of the annular groove portion 10a, and can be withdrawn downward.

The above embodiment is described in connection with only the brushless axial flow fan motor, but the invention is not limited to the above embodiment, and may be applied to various kinds of motors used in variety fields.

As described above, this invention can provide a motor rotor supporting structure in which a motor rotor with a rotating body secured to a motor shaft is supported by a bearing of a housing body having a stator, which is applicable in both types of a metal bearing containing oil and sintered and a radial ball bearing, thereby preventing the manufacturing process from being complicated, and the costs from increasing.

What is claimed is:

1. A motor rotor supporting structure, comprising:
   a motor rotor which includes a motor shaft and a rotating member including a blade secured to the motor shaft;
   a bearing, for supporting the motor rotor, provided to a housing body which includes a stator; and
   an annular groove portion integrally formed with and extending from a mounting base to which the motor shaft of the motor rotor is secured,
   wherein said annular groove portion is adapted to receive a spacer and includes a beveled portion.

2. The motor rotor supporting structure according to claim 1, further comprising an oil-impregnated sintered metal bearing.

3. The motor rotor supporting structure according to claim 1, further comprising a metal bearing supporting said motor rotor.

4. The motor rotor supporting structure according to claim 1, further comprising:
   a radial ball bearing supporting the motor rotor; and
   a spacer detachably attached to the inner portion of the annular groove portion.

5. The motor rotor supporting structure of claim 4, wherein said radial ball bearing comprises an inner race that axially abuts said spacer.

6. The motor rotor supporting structure of claim 1, wherein said beveled portion comprises a cone-shaped portion.

7. The motor rotor supporting structure of claim 1, further comprising a spacer detachably attached to the inner portion of the annular groove portion, wherein said bearing comprises an oil-impregnated sintered metal bearing and a radial ball bearing comprising an inner race that axially abuts said spacer.

8. A mounting base for a motor rotor, comprising:
   a base having an annular groove portion including an inner peripheral face; and
   a blade portion extending radially outward of said annular groove portion, wherein said inner peripheral face is adapted to receive a spacer and includes a beveled portion.

9. The base of claim 8, further comprising a spacer received in said inner peripheral face.

10. The base of claim 9, wherein an inner diameter of said inner peripheral face is less than an outer diameter of said spacer.

11. A fan motor comprising:
a housing including a cylindrical base portion supporting a bearing;
a motor shaft supported by said bearing; and
a mounting base including an annular groove portion receiving said motor shaft, wherein said annular groove portion comprises:
an inner peripheral face adapted to receive a spacer; and
a beveled portion adjacent said inner peripheral face.

12. The motor of claim 11, wherein said beveled portion comprises a cone-shaped portion.

13. The motor of claim 11, further comprising a spacer received in said inner peripheral face.

14. The motor of claim 13, wherein an inner diameter of said inner peripheral face is less than an outer diameter of said spacer.

15. The motor of claim 13, wherein said bearing comprises a ball bearing comprising an inner race that axially abuts said spacer.

16. The motor of claim 13, wherein said bearing comprises an oil-impregnated sintered metal bearing and a ball bearing comprising an inner race that axially abuts said spacer.

17. The motor of claim 13, wherein a diameter of said motor shaft is less than or equal to an inner diameter of said spacer.

18. The motor of claim 13, further comprising a stator mounted on said housing.

19. The motor of claim 11, further comprising a magnet mounted on said mounting base.

20. The motor of claim 11, wherein said bearing comprises an oil-impregnated sintered metal bearing.

* * * * *